June 26, 1923.
A. M. WILLIAMS
STIRRING PADDLE
Filed March 16, 1923
1,460,007
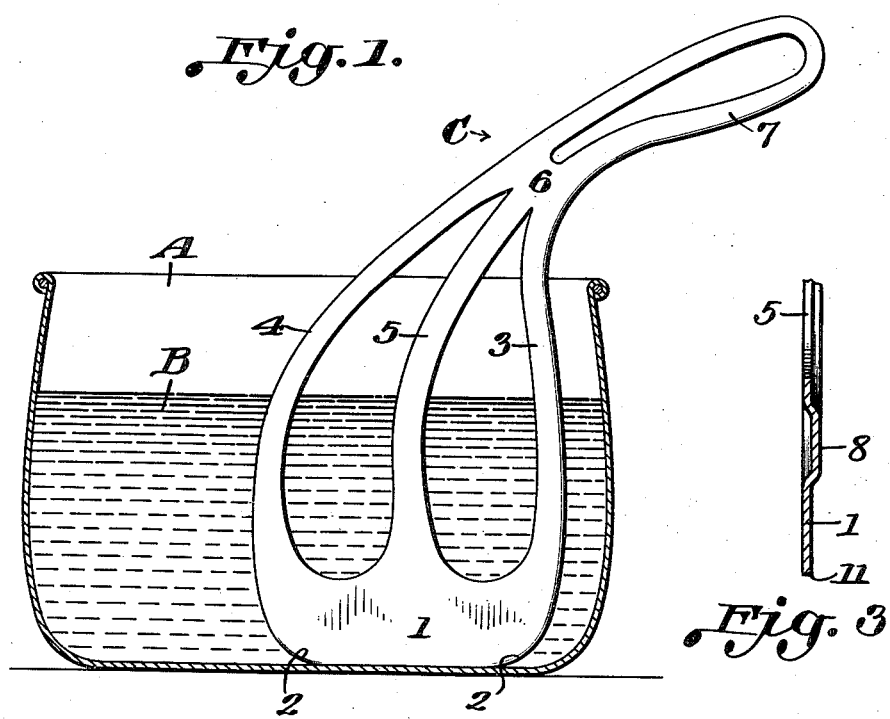
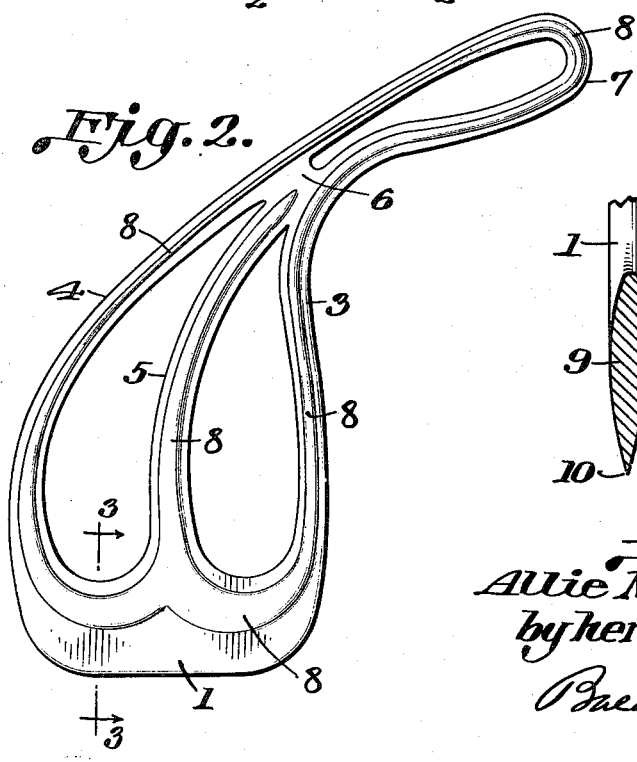
Inventor
Allie M. Williams
by her Attorneys

Patented June 26, 1923.

1,460,007

UNITED STATES PATENT OFFICE.

ALLIE M. WILLIAMS, OF FORT SMITH, ARKANSAS.

STIRRING PADDLE.

Application filed March 16, 1923. Serial No. 625,494.

*To all whom it may concern:*

Be it known that I, ALLIE M. WILLIAMS, a citizen of the United States, and resident of Fort Smith, in the county of Sebastian and State of Arkansas, have invented certain new and useful Improvements in a Stirring Paddle, of which the following is a specification.

In various cooking operations, particularly preserving and canning, it is necessary to stir the contents of the vessel frequently both for the purpose of agitating the contents and to prevent the same from adhering to the bottom of the vessel. It has been found difficult to engage the entire cooking surface by the usual spoons or stirring utensils, as either some portion of the bottom or the rounded corners will escape contact with said spoon or similar device. Furthermore, it is usually necessary to hold the hand directly over the cooking material, which in many cases is uncomfortable and even dangerous.

An object of my invention is to provide a paddle or stirring blade by which the entire surface of the interior of the vessel, bottom, sides and rounded corners, may be rapidly and completely scraped, thus preventing the accumulation of any parts of the contents to the vessel at any part.

A further object is to provide such a means which can be operated without holding the hand directly over the vessel and can thus be employed even when the contents of the container are boiling to the extent that they are greatly agitated.

A further object is the construction of such a device which will be simple, easy to manufacture, easy to clean, and very efficient in operation.

Other objects will be apparent from the following detailed description and the appended claims.

In the drawings:

Figure 1 is a sectional view of a vessel containing liquid contents and the paddle shown in operative position and in perspective.

Figure 2 is a perspective view of a paddle showing certain modifications.

Figure 3 is a cross section on the line 3—3 of Figure 2.

Figure 4 is a similar section of a modified form.

The drawings show a cooking vessel A containing liquid or semi-liquid contents B and the stirring paddle C in operative position. The vessel has the ordinary flat bottom with slightly curved sides and rounded corners connecting the bottom and sides. The majority of vessels employed at the present time for such purposes are of similar shape, but my invention can be used to advantage in connection with vessels or containers of different shapes.

The stirring paddle C has a relatively broad bottom portion 1 with rounded corners 2 at the junction of the bottom with the sides 3 and 4. For the purpose of making the stirrer lighter and also improving its operation it has two open spaces between the side members 2 and 3 and a central member 5. All three of the strips or members 3, 4 and 5 are inclined towards one side, in the embodiment shown toward the left of Figure 1, the side member 3 being inclined but little, the middle member 5 appreciably curved and the outer member 4 having considerable curvature.

The three members 3, 4 and 5 meet at a junction point 6 and the handle 7 extends outwardly from this point. The handle may also have an opening therein as shown to make the device lighter and keep the handle portion cooler. It is important to note that the handle portion is offset to one side a sufficient distance so that the stirrer may be used in contact with the bottom of the vessel to the center and beyond without the hand of the user coming over the open top of the vessel. In this manner, the contents of the vessel may be stirred during boiling without danger of the rising steam injuring the user.

The difference in curvature of the outer edges of the two sides 3 and 4 enables the device to be used with vessels whose sides may vary in curvature, and still have a direct scraping contact for a considerable extent between the side of the vessel and the stirrer. The corners 2 will be rounded properly to fit the corners of the usual vessel, and the two corners 2 may be differently rounded if desired.

The stirrer will be constructed of whatever material appears most desirable, and may be made in one or more pieces, particularly if it is desired to have a handle of different shape or material from that of the body of the device. However, it will be found preferable to stamp the device out of relatively thin sheet metal, as shown, in which case the edge 11 (see Fig. 3) will be thin enough to scrape efficiently the bottom and sides of the vessel.

If desired, the various parts 1, 3, 4, 5 and 7, or any part thereof, may be provided with a rib 8, as shown in Figures 2 and 3, which will enable the device to be stamped at one operation of quite light sheet metal and still have the necessary strength to withstand any use to which it may be placed. It is evident that the size and thickness of the device should bear some relation to each other, and a large stirrer for heavy work would preferably be constructed of thicker material.

In fact, for some purposes it may be desirable to cast the stirrer in the desired form, so that a cross section thereof would have a generally oval form as shown in Figure 4, and may terminate in a relatively sharp edge 10. Such a stirrer would be adapted for heavier work and would probably have its handle somewhat more offset than is shown in the drawings to enable its use with larger vessels without the hand of the operator necessarily being exposed to steam from the boiling contents.

The stirrer may also be used as a scraper for cleaning vessels of the character illustrated, since the bottom and sides can be efficiently and rapidly scraped and cleaned, as a large portion of the surface can be scraped at one time. Other uses will suggest themselves.

It will be obvious that my invention provides an efficient stirring paddle which can be manufactured at a low cost, if desired, and will be very efficient in operation. Its shape enables one to use the same with ease and efficiency even though the contents of the vessel are boiling and steam may be rising therefrom. The offset handle will permit its use at such times with no danger to the hands of the operator. It can moreover be used by either hand with equal ease.

Minor changes may be made in form and material without departing from the spirit of the invention, and it is to be understood that the invention is limited only by the scope of the appended claims.

I claim as my invention:—

1. A stirring paddle comprising a bottom portion with straight edge and curved corners, a body portion rising therefrom and inclined to one side in the plane thereof and having curved edges, and a handle portion forming a continuation of said body and following the inclination thereof.

2. A stirring paddle comprising a bottom portion with straight edge and curved corners, a body portion with curved edges rising therefrom and bent in the plane thereof, and an offset handle portion.

3. A stirring paddle comprising a bottom portion with straight edge and curved corners, a body portion with curved edges rising therefrom and laterally offset in the plane thereof, the curvature of the two edges being different, and an offset handle portion.

4. A stirring paddle comprising a bottom portion having a straight edge, an upwardly extending body portion with curved edges and inclined in the plane thereof, and an offset handle, both the body portion and the handle being provided with cut outs.

5. A stirring paddle comprising a single piece of metal and having a bottom portion with a straight edge and curved corners, an upwardly extending body portion with differently curved edges and inclined in the plane thereof, and a handle portion similarly inclined.

6. A stirring paddle comprising a single piece of stamped sheet metal having a bottom portion with a straight edge and curved corners, a body portion rising therefrom which has curved edges and is inclined sidewise in the plane thereof, and a handle portion similarly inclined, all portions being provided with a strengthening rib.

In testimony whereof, I have hereunto subscribed my name.

ALLIE M. WILLIAMS.